Feb. 22, 1955 A. M. FRENDBERG 2,702,726
FUEL FEEDING APPARATUS
Filed June 18, 1952
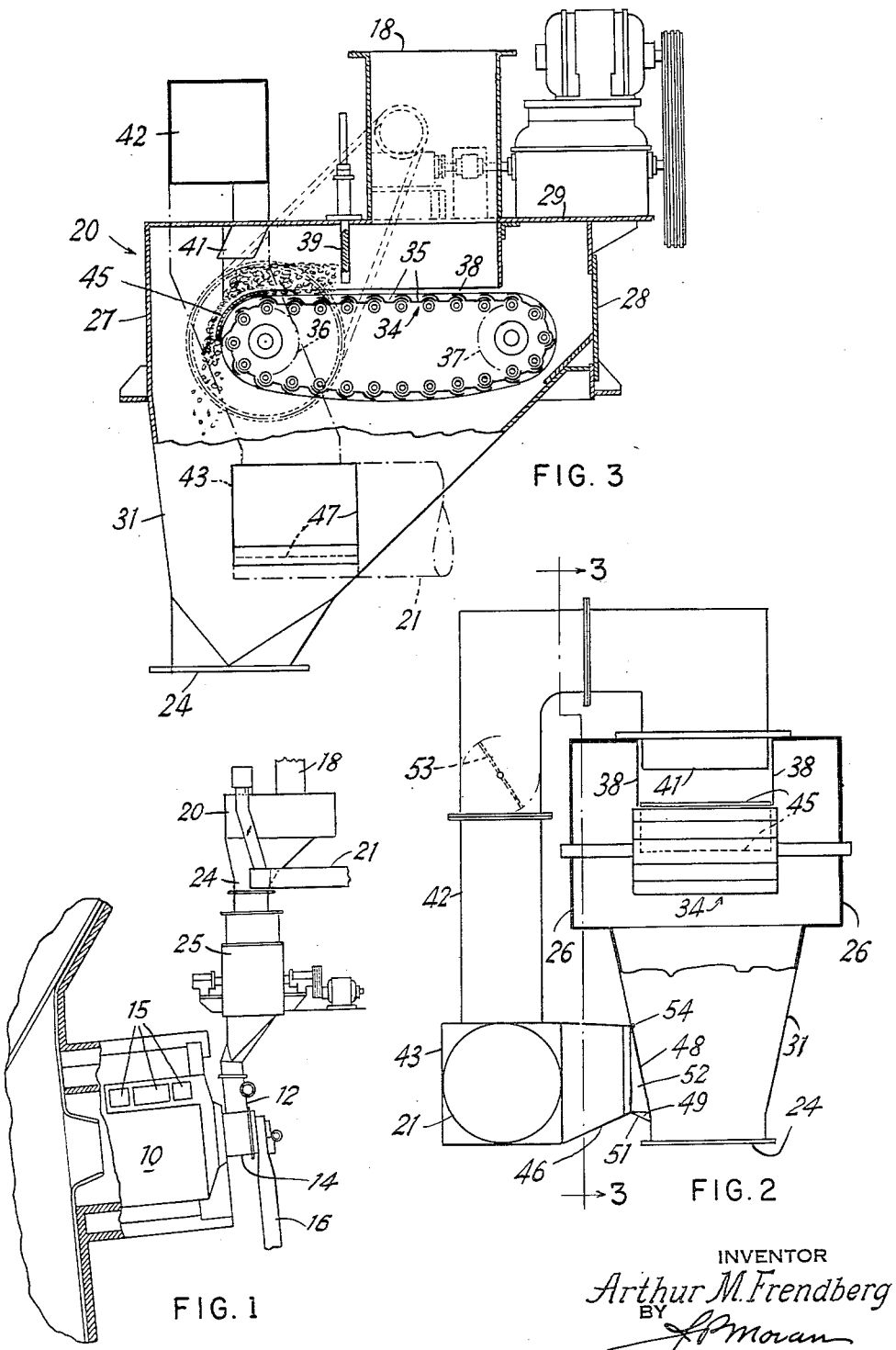
INVENTOR
*Arthur M. Frendberg*
BY
*J. P. Moran*
ATTORNEY

United States Patent Office 2,702,726
Patented Feb. 22, 1955

2,702,726

FUEL FEEDING APPARATUS

Arthur M. Frendberg, Westport, Conn., assignor to The Babcock & Wilcox Company, New York, N. Y., a corporation of New Jersey Application June 18, 1952, Serial No. 294,207

7 Claims. (Cl. 302—61)

The present invention relates to apparatus for feeding ash-containing solid fuel to a combustion zone in a crushed or coarsely pulverized granular condition. The apparatus is especially adapted for use in feeding slag forming fuels to furnaces of the cyclone type in which the fuel is burned at furnace chamber temperatures above the ash fusion temperature to thereby permit removal of the incombustible ash residue from the combustion chamber as a liquid slag.

The granular fuels normally used in such furnaces are reduced to particle sizes of ⅜″ and under, and contain as a result of the fuel crushing or reducing operation, a proportion of dustlike particles known as "fines." The fuel and air mixture is introduced into the primary combustion chamber adjacent one end through a tangential inlet arranged to effect a whirling motion of the fuel and air mixture in a helical path axially of and toward the opposite end of the furnace. In operation, the entering fuel and air stream is rapidly ignited and the centrifugal effect of the whirling stream causes the ash particles released from the burning fuel particles to deposit in a molten condition on circumferential furnace wall areas so as to form a film or layer of molten slag thereon on which the heavier fuel particles are caught and burned, while the lighter fuel particles burn mainly in suspension. The resulting gaseous products of combustion are normally discharged through a central outlet at one end and the molten slag through a bottom outlet at the same end.

In order to maintain stable combustion conditions and consistently uniform internal furnace pressure values at all operating capacities, it is essential that the supply of air and fuel to the cyclone furnace be continuous, and also uniformly regulable throughout the entire period of operation for each predetermined rate. In some instances, however, difficulty may be experienced in maintaining the required uniformity in the rate at which fuel is fed to the cyclone furnace or furnaces even when utilizing the kind of feeder equipment normally found satisfactory for the purpose. For example, when using an apron type conveyor as a feeder for crushed coal, which at times may contain a certain amount of moisture, the coal tends to pack on the apron and thus passes over the discharge end of the feeder in lumps. Such irregularities in the rate of fuel discharge from the feeder have a direct and corresponding effect on the rate at which fuel is fed to the cyclone furnace, particularly at the lower capacities, when the effect of the irregularities is exaggerated, due to the lower rates of fuel delivery involved.

This invention therefore contemplates a means for improving cyclone furnace operation by which the massing of fuel particles on and along the fuel supporting surface of a conveyor type feeder is substantially prevented and any accumulations of packed masses of fuel are converted into a mobile layer of separate fuel particles, whereby the fuel may be fed to the furnace at predetermined regulable rates.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described an embodiment of my invention.

Of the drawings:

Fig. 1 is an elevational view of cyclone furnace fuel feeding apparatus including an embodiment of my invention;

Fig. 2 is a partial side elevational view of Fig. 1, partly broken away to expose the feeder mechanism; and Fig. 3 is a front elevational view of Fig. 2, similarly broken away.

As indicated in Fig. 1, a cyclone furnace 10, generally of a type disclosed in U. S. Patent 2,357,301, for example, is suitably fired with an ash-containing solid fuel such as bituminous or semi-bituminous coal, in crushed or granular condition, as hereinbefore described. The fuel is supplied in a stream of preheated primary air and directed through an inlet conduit 12 tangentially of and within a burner housing 14 from which it continues in a helical path along walls of the larger primary combustion chamber into which secondary air is admitted tangentially through ports 15. Tertiary air may be admitted tangentially into an outer extension of housing 14 through conduit 16. Gases and slag are separately discharged through outlets provided at the opposite end of the furnace.

The fuel thus supplied to furnace 10 is initially received in a crushed condition through a fuel inlet pipe 18, from a suitable source not shown, and caused to pass through an apron-type feeder 20 of a construction similar to the construction of feeder disclosed in the copending application of George A. Watts, Serial No. 157,859, filed April 25, 1950, now Patent No. 2,603,145, July 15, 1952. Preheated primary air is admitted to the feeder from an air supply duct 21 to which the air is supplied at appreciable pressure. The primary air, together with the measured fuel, is continuously discharged from the feeder through a common bottom outlet 24 into a fuel conditioner mill 25, suitably of a known hammer-type, in which the fuel is further reduced or crushed to a granular form providing fuel particles of sizes hereinbefore mentioned. The reduced, granular fuel is continuously discharged with air from the bottom of mill 25 and thus provides the primary air-fuel stream which is directed through conduit 12 into the cyclone burner 14.

As illustrated in Figs. 2 and 3, the feeder 20 includes an outer housing having side walls 26, front and rear end walls 27 and 28, and a top wall 29 in which the fuel inlet pipe 18 is provided. The lower portion of the housing is formed as a discharge chute 31 having its lateral walls converging downwardly in pairs to the bottom fuel and air outlet 24. The feeder mechanism comprises an endless conveyor belt 34, of a known apron type, having its material supporting surface formed of overlapping metal segments such as pans 35 which are carried by successive links of a double strand roller chain. The strands of the chain engage front and rear sprockets 36, 37 as indicated, while upright skirt plates 38 are provided at opposite sides for confining the conveyed fuel within the width dimensions of the conveyor pans 35. A vertically adjustable gate 39 serves to regulate the depth of material being conveyed. These and other basic elements of the feeder construction, including the driving mechanism, are of essentially the same form and arrangement as disclosed in the aforesaid Patent No. 2,603,145. The overall rate of feed may therefore be regulated by an adjustment of motor speed, or by raising or lowering the gate 39, or by a combination of both such adjustments.

As a means for maintaining a substantially uniform rate of fuel discharge from the moving conveyor belt 34, there is provided a nozzle 41 through which preheated primary air is discharged at high velocity downwardly and forwardly against the moving layer of fuel at approximately the location at which the belt begins to curve downwardly around the front drive sprockets 36. Air is supplied to the nozzle from conduit 42 which is connected to the main supply duct 21 through a manifold 43. The nozzle 41 extends substantially throughout the width of the conveyor between side skirts 38, indicated, and is directed downwardly and forwardly at an acute angle so as to cause the jet of air to impinge against the fuel in a common direction with fuel movement adjacent the discharge end. In the embodiment illustrated, the nozzle 41 extends in approximately tangential relation to the generally curved contour of the outer conveyor surface about sprockets 36 at the discharge end, the nozzle being suitably formed with its outlet in a plane generally parallel to the top run of the conveyor. The preheated primary air is supplied to nozzle 41 at a high positive pressure, e. g. 40 inches, H₂O. The high velocity air jet from nozzle 41 serves to break up any massed quantities of fuel in the moving layer that might otherwise be discharged into the chute 31 in lumps. Furthermore, with the air preheated as described, the tendency of moist coal to remain packed is appreciably lessened, due to the drying action afforded.

As an additional feature, in order to insure that the conveyor is continuously cleared of all fuel at the forward end, a curved skimmer plate 45 is mounted directly above the discharge end of belt 34, throughout at least its upper front quadrant section on sprockets 36, so as to provide a smooth outer surface over which the fuel is discharged and from which the removal of all fuel is facilitated by the sweeping action of air discharging from nozzle 41. The plate 45 extends between the side skirts 38 by which it is supported and furthermore is approximately concentrically spaced from the discharge end of the conveyor while maintaining only a nominal working clearance therebetween. The plate 45 is curved to a slightly greater radius than the conveyor belt 34, and suitably about an axis vertically below the axis of drive sprockets 36 so as to provide increased clearance toward the fuel discharge end.

Provision is also made for continuously introducing a small proportion of the total primary air into the feeder housing at a location below the conveyor 34, mainly for scavenging purposes so as to inhibit the build-up of fuel on walls of the chute. The air thus introduced is tapped from the air supply manifold 43 through a branch conduit 46 which communicates with the interior of chute 31 through a rectangular opening 47 formed in an inclined side wall thereof. The air conduit 46 is suitably tapered as shown to provide a progressively decreasing flow area toward its connection to chute 31. A rectangularly formed baffle plate or deflector 48 is mounted at the inner end of conduit section 46 so as to block off the greater part of opening 47 from its upper margin while leaving only a small remaining rectangular area 49 at the bottom through which air enters the feeder discharge chute 31. The bottom wall of conduit section 46 is connected to chute 31 by a narrow plate portion 51 which is inclined downwardly toward chute 31 so as to prevent coal from settling into the air pasage. The deflector 48 is formed with triangular side flanges 52 along its opposite upright margins so as to provide an overlapping seal with side wall portions of conduit section 46, and thus cause all scavenging air to pass beneath the lower edge of the deflector. With this arrangement, the air introduced through nozzle 41 above the conveyor 34 constitutes about 85% of the total primary air supplied to the cyclone burner 14, thereby reserving the remaining 15% air for direct admission to that portion of the housing from which the total mixture of fuel and air is discharged to the fuel conditioner 25. A damper 53 is provided in conduit 42 whereby these relative air quantities may be suitably adjusted and varied. Further adjustment of air flow through opening 49 may be obtained by pivotally supporting deflector 48 along its upper edge, as indicated at 54.

As will be understood, the present invention also embraces the use of feeder 20 for fuel previously conditioned to the granular form required for delivery to cyclone furnace 10 in which case the conditioner mill 25 is omitted from the location indicated and the primary air-fuel stream from the feeder outlet 24 is directed without further treatment to the cyclone furnace burner 14.

The invention thus provides a remedy for one of the difficulties encountered in feeding certain varieties of solid fuels to cyclone furnaces, particularly when the fuels are in a moist condition. When such fuels tend to pack on the feeder conveyor, the jet of preheated air directed against the moving layer of fuel serves to break up the masses of fuel and furthermore disintegrates the masses to such an extent that the rate of fuel particle discharge is rendered substantially uniform at any given rate of travel of the fuel supporting surface. Moreover, the jet is formed of preheated air by which the fuel is fed to the cyclone furnace and thus is continuously available in the quantities required whereby the invention may be utilized with a minimum of additional expense for special equipment.

While in accordance with the provisions of the statutes I have disclosed herein the best form of the invention now known to me, those skilled in the art will understand that changes may be made in the form of the apparatus disclosed without departing from the spirit of the invention covered by my claims, and that certain features of the invention may sometimes be used to advantage without a corresponding use of other features.

I claim:

1. Apparatus for supplying fuel and primary air to a furnace operable under superatmospheric internal pressure comprising, a continuous feeder conveyor operable in its entirety within an enlcosing housing and adapted to discharge fuel received thereon from one end of the conveyor into a lower portion of said housing, said housing having an upper inlet through which solid fuel of reduced particle sizes is delivered to only a limited portion of said conveyor at a location spaced from said discharge end, an air supply nozzle extending downwardly within said housing toward the top run of said conveyor in a drection corresponding generally to the direction of fuel movement toward the dicharge end of the conveyor, and means for supplying primary air to said nozzle at a pressure causing said air to impinge on fuel on said conveyor, said housing havng walls extending downwardly below said conveyor from positions adjacent opposite ends thereof and defining a discharge chute formed with a lower outlet through which a stream of said primary air and fuel suspended therein is discharged for delivery to said furnace.

2. Apparatus as defined in claim 1 wherein said primary air supply nozzle extends downwardly at a relatively steep angle toward the discharge end of the conveyor and furthermore is formed with an outlet substantially parallel to the top run of said conveyor and continuous substantially throughout the width of said run.

3. Apparatus as defined in claim 1 and further comprising means for separately introducing additional primary air drectly into said chute at an elevaton upstream of said lower air and fuel outlet.

4. Apparatus as defined in claim 3 wherein said means for introducing primary air directly into the chute is formed as a branch conduit joined to a side wall of said chute at the perimeter of an opening formed in said side wall, and a deflector closing said opening to an extent leaving only a lower portion clear for the admission of said additional air into said chute, said deflector sloping downwardly and inwardly toward the interior of said chute.

5. Apparatus as defined in claim 4 wherein said deflector is formed with side flanges forming continuations of side wall portions of said branch conduit for preventing air admission into said chute at the sides of said deflector.

6. Apparatus for supplying fuel and primary air to a cyclone furnace operable under superatmospheric internal pressure comprising, an apron tvpe feeder having a continuous feeder conveyor operable in its entirety within an enclosing housing and adapted to discharge fuel received thereon from one end of said convevor into a lower portion of said housing, said housing having an upper inlet through which solid fuel of reduced particle sizes delivered to only a limited portion of said conveyor at a location spaced from said discharge end, said conveyor at its discharge end presentng an outer surface contour of generally convex curvature throughout the width of the conveyor, an air supply nozzle extending downwardly and forwardly within said housing toward the convexedly curved discharge end of said conveyor, and a skimmer plate overlving said conveyor at its curved discharge end throughout an upper quadrant section thereof and presenting a convexedly curved smooth outer surface over which fuel from said conveyor is discharged, said nozzle extending tangentially with respect to said curved discharge end so as to cause air issuing from said nozzle to impinge against fuel entering upon said curved outer surface of said skimmer plate, said housing being formed with a lower outlet through which a stream of said air and fuel suspended therein is discharged for delivery to said furnace.

7. Apparatus as defined in claim 6 and further comprising means rotatable about a horizontal axis and providing support for said conveyor at said convexedly curved discharge end, said skimmer plate being curved about a horizontal axis arranged parallel to and below said axis of rotation of said conveyor support means.

References Cited in the file of this patent

UNITED STATES PATENTS

| | | |
|---|---|---|
| 724,974 | Vaughan | Apr. 7, 1903 |
| 740,097 | Davis | Sept. 29, 1903 |
| 745,247 | Shontz | Nov. 24, 1903 |
| 2,191,096 | McCurdy | Feb. 20, 1940 |